C. V. MERLING.
RESILIENT VEHICLE TIRE.
APPLICATION FILED JAN. 29, 1917.

1,290,630.

Patented Jan. 7, 1919.

INVENTOR
Charles V. Merling
BY
C. D. Haskins
ATTORNEY

UNITED STATES PATENT OFFICE.

CHARLES V. MERLING, OF CENTRALIA, WASHINGTON.

RESILIENT VEHICLE-TIRE.

1,290,630.　　　　　Specification of Letters Patent.　　Patented Jan. 7, 1919.

Application filed January 29, 1917. Serial No. 145,302.

*To all whom it may concern:*

Be it known that I, CHARLES V. MERLING, citizen of the United States, residing at Centralia, in the county of Lewis and State of Washington, have invented a certain new and useful Improvement in Resilient Vehicle-Tires, of which the following is a specification.

My invention relates to improvements in tire casings for pneumatic tires of vehicle wheels, and the object of my invention is to provide a flexible tire casing which shall be adapted to be releasably fastened to the rim of a vehicle wheel to cover and confine within it an inflated elastic tube, and which shall be made of pieces of textile fabric united by adhesive material, as vulcanized soft rubber, to form a single structure, said pieces of fabric being of such form and so relatively disposed that portions of their edges shall constitute the wearing surface of the tread portion of the tire.

A further object of my invention is to provide a flexible tire casing which shall be stronger, more durable and less easily punctured than are tire casings heretofore made.

I accomplish these objects by devices illustrated in the accompanying drawings, wherein—

Figure 1:
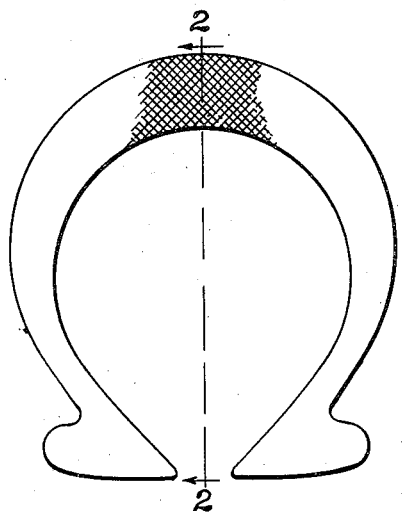
Figure 1 is a view in side elevation of one of a plurality of sections which are united to form a tire casing which embodies my invention.
Figure 2:
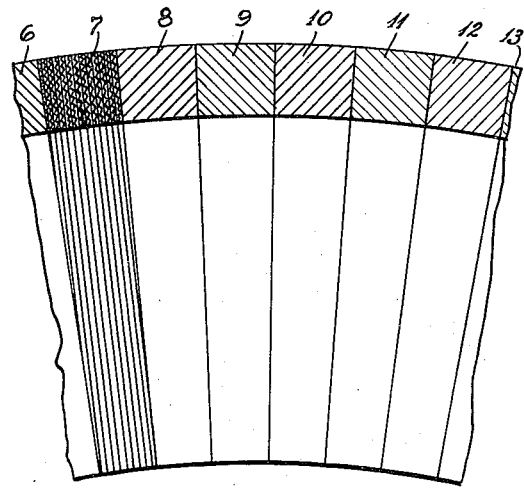
Fig. 2 is a sectional view, on broken line 2, 2 of Fig. 1, of a segment of a tire casing comprising a number of the sections like the section shown in Fig. 1, which sections are united by adhesive material.
Figure 3:
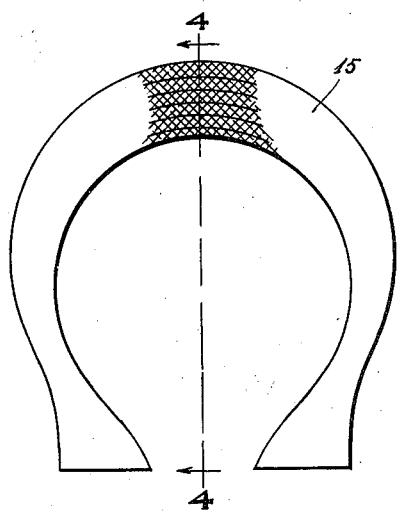
Fig. 3 is a view in side elevation of a modified form of a section of a tire casing embodying my invention.
Figure 4:
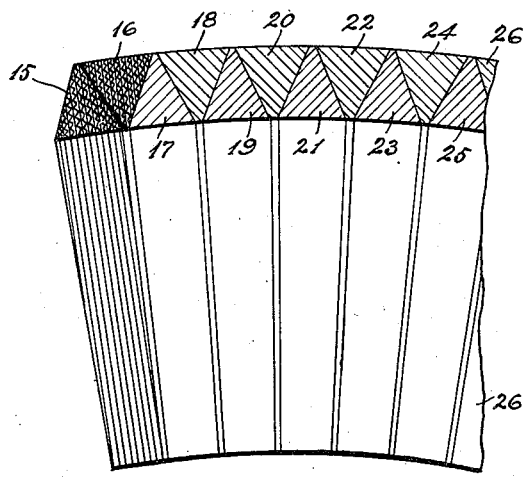
Figure 5:
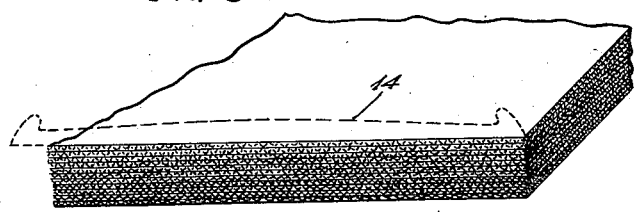

Fig. 4 is a sectional view on broken line 4, 4 of Fig. 3 of a segment of a tire casing comprising a number of united sections like the section shown in Fig. 3; and Fig. 5 is a perspective view of a piece of prepared material of which the tire casings of Figs. 1 and 2 and Figs. 3 and 4 are preferably made.

Referring to the drawings, throughout which like reference numerals indicate like parts, 6, 7, 8, 9, 10, 11, 12 and 13 designate sections of a segmental portion of a tire casing that is adapted to be disposed upon and to surround the rim of a vehicle wheel to inclose and confine within it an inner pneumatic tube (not shown) in a well known manner.

Each section of the tire casing, like the sections 6, 7, 8, 9, 10, 11, 12 and 13, in side elevation, is of the form shown in Fig. 1 and each like section 7, comprises a plurality of pieces of woven textile fabric, as, for instance, canvas, the sides of all adjacent ones of which pieces are united by adhesive material, as vulcanized soft rubber, to form a unitary section of horseshoe-like form, and all of said sections are disposed side by side and united by like adhesive material to form a completed tire casing.

Each section of the tire casing like section 7, is formed so that it is thicker in that portion that forms a part of the tread portion of a tire casing and thinner in that portion that engages with the rim of a wheel, whereby the joined side surfaces of adjacent ones of said sections are in a plane radiating from the axis of the tire casing, as shown in Fig. 2, and whereby the periphery of the tire casing will describe a true circle which will be concentric with the vehicle wheel upon which the tire casing may be mounted.

In the operation of constructing the several sections of the tire casings, preferably I form them by cutting strips from material commonly used for steam packing which consists of a plurality of sheets of rubber coated canvas stuck together by pressure to form a laminated board similar to that illustrated in Fig. 5, said strips each being cut in a form whose outline, on a reduced scale, is indicated by a dotted line 14 in Fig. 5 whereupon its thickness is tapered as required from its central portion toward each of its opposite ends, and its opposite side surfaces are then coated with soft rubber cement.

To form a tire casing, a requisite number of the strips thus prepared are placed on a former ring side by side and bent edgewise into a horseshoe-like form and pressed sidewise against each other firmly to stick them one to another to form a complete unitary tire casing which is confined on said former ring while said completed tire casing is subjected to the operation of vulcanizing the soft rubber by which the sections are united.

Obviously, a section of horseshoe-like form may be cut by dies from material of the form shown in Fig. 5 but in such case there would be considerable waste of such material.

In Fig. 4 I have shown a segmental portion of a tire casing slightly modified in form of cross-section, which tire casing is made of sections, like sections, 15, 16, 17, 18, 19, 20, 21, 22, 23, 24, 25 and 26, the section 15 of which is shown in side elevation in Fig. 3.

Each of the sections of such modified form of tire casing is of the form of an isosceles triangle in cross-section, and alternate ones of them, as the sections 16, 18, 20, 22, 24 and 26 are disposed each with the base of its said triangle in a position to form the outer side surface of the tire casing, while the other alternate ones of them, as sections 15, 17, 19, 21, 23 and 25 are disposed each with the base of its said triangle in a position to form the inner side surface of the tire casing, as clearly shown in Fig. 4, in which positions a sufficient number of said sections to make a complete tire casing are placed upon a former ring side by side and united each to adjacent ones by rubber cement which is then vulcanized thus to produce a completed tire casing in an obvious manner.

The advantages of making the sections of the form of an isosceles triangle in cross-section is that pressure exerted by an inflated pneumatic tube against the inner surfaces of the bases of alternate sections, like sections 15, 17, 19, 21, 23 and 25 tends in a wedge-like manner to force them between the other alternate sections 16, 18, 20, 22, 24 and 26 to make a tighter joint between adjacent surfaces, while pressure on the tread of the tire due to contact with a roadway will tend to cause the sections 16, 18, 20, 22, 24 and 26, in a wedge-like manner, to be forced inwardly between the alternate sections 15, 17, 19, 21, 23 and 25; thus the tire casing while in use will be subjected to no strains which tend to separate adjacent ones of its sections.

The sections, like the sections 15 to 26, inclusive, of Fig. 4, may in an obvious manner, be cut into the required form from material like that illustrated in Fig. 5.

Preferably, the sections for a tire casing are cut from material illustrated in Fig. 5 in such manner that the threads of both the warp and weft of the canvas will lie in lines that shall be at an angle to the surface of the tread portion of the tire so that only the end surfaces of said threads shall be subjected to wear.

Manifestly, my invention may be embodied in tire casings whose forms in radial section differ widely from the tire casings illustrated in Figs. 1 and 2 and in Figs. 3 and 4, and changes may be made in the material, the form, the dimensions and arrangement of parts of my invention without departing from the spirit thereof.

What I claim is:

1. A tire casing comprising a plurality of sections, each of the form of a triangle in cross-section and each embodying a plurality of pieces of textile fabric disposed side by side and united by adhesive material each of one-half of the number of said sections having the apex of said triangle projecting inwardly and each of the other one-half of the number of said sections having the apex of said triangle project outwardly, said sections being disposed side by side and united by adhesive material to form a unitary tire casing, alternate ones of said sections having their apexes projecting toward the exterior surface of the tire casing and the apexes of the others thereof projecting toward the inner surface of said tire casing.

2. A tire casing comprising a plurality of sections, each section including a plurality of pieces of textile fabric disposed side by side and united by adhesive material, said pieces being of shapes substantially similar to the general form, in radial sections, of a tire casing, said sections being disposed side by side and united by adhesive material to form a unitary structure.

In witness whereof, I, hereunto subscribe my name this 18th day of January, A. D. 1917.

CHARLES V. MERLING.